United States Patent [19]

Renner et al.

[11] Patent Number: 5,403,135
[45] Date of Patent: Apr. 4, 1995

[54] BLIND RIVET NUT WITH PULLING MANDREL

[75] Inventors: Wolf Renner, Giessen; Dieter Mauer, Lollar, both of Germany

[73] Assignee: Emhart Inc., Newark, Del.

[21] Appl. No.: 90,829

[22] Filed: Jul. 12, 1993

Related U.S. Application Data

[63] Continuation-in-part of Ser. No. 818,948, Jan. 10, 1992, Pat. No. 5,259,713.

[30] Foreign Application Priority Data

Jan. 11, 1991 [DE] Germany ............... 41 00 709.3

[51] Int. Cl.⁶ .................... F16B 13/04; F16B 37/04
[52] U.S. Cl. ...................... 411/34; 411/183; 29/525.2
[58] Field of Search .................. 411/34–38, 411/43, 55, 177, 183; 470/29, 30; 29/524.1, 525.2

[56] References Cited

U.S. PATENT DOCUMENTS

| 2,148,977 | 2/1939 | Buck | 411/38 |
| 2,188,422 | 7/1940 | Waner | 411/34 |
| 2,392,133 | 1/1946 | Eklund | 411/34 |
| 2,887,926 | 5/1959 | Edwards | 411/38 |

FOREIGN PATENT DOCUMENTS

| 241038 | 4/1960 | Australia | 411/34 |
| 45-34333 | 11/1970 | Japan | 411/38 |

Primary Examiner—Neill R. Wilson
Attorney, Agent, or Firm—Edward D. Murphy

[57] ABSTRACT

A blind rivet nut with a pulling mandrel, having a flanged rivet tube with an internal thread has the pulling mandrel in the form of a cap screw, the cap being used to engage a setting tool. The cap screw is a self-tapping screw.

8 Claims, 1 Drawing Sheet

BLIND RIVET NUT WITH PULLING MANDREL

This application is a continuation-in-part of Ser. No. 07/818,948, filed on Jan. 10, 1992, now U.S. Pat. No. 5,259,713.

BACKGROUND OF THE INVENTION

The invention relates to a blind rivet nut with pulling mandrel having a rivet tube with a flange, which is provided on its side remote from the flange with an internal thread extending from the end of the rivet tube via a portion of the rivet tube to a clinch zone of the rivet tube which is enlarged by means of a pulling mandrel fitting into the internal thread when the blind rivet nut is set, such that a workpiece receiving the blind rivet nut is clamped by the flange and the enlargement.

A blind rivet nut of this type is known from European Patent Application 158 304. For setting this blind rivet nut a particular pulling mandrel is used which pertains to the setting tool and is provided at its end extending into the internal thread of the blind rivet nut with an external thread fitting into the internal thread of the blind rivet nut and extending over the length thereof so that the pulling mandrel is capable of exerting a pulling force over the length of the internal thread on the rivet tube and of enlarging it in the region of its clinch zone. During the setting of the blind rivet nut, an opposing force is exerted on the flange of the rivet tube by a pressure piece penetrated by the pulling mandrel so that the force acting on the pulling mandrel can act fully on the clinch zone of the rivet tube, the pulling mandrel sliding, as during the setting of a conventional blind rivet, through the pressure piece formed by the setting tool during the setting of a conventional blind rivet. A workpiece, such for example as a sheet metal plate penetrated by the blind rivet nut, is clamped during this setting process so that the set blind rivet nut is therefore riveted. The workpiece is clamped between the flange of the rivet tube on the one hand and the enlargement of the rivet tube on the other hand. After the blind rivet nut has been set, the special pulling mandrel is screwed out of the blind rivet nut so that the blind rivet nut is available for screwing-in of a suitable bolt.

In addition, reference should also be made to German Gebrauchsmuster G90 01 069.8 relating to a blind rivet nut which is set by means of a fastening screw screwed into the blind rivet nut. The blind rivet nut is provided with a rivet tube of elastic material, more specifically rubber, into which a pipe provided with an internal thread is inserted. The pipe is rigidly connected to the rubber tube, for example by vulcanization. As the fastening screw is tightened, the rubber tube is compressed and forms a bead which is set behind the workpiece carrying the blind rivet nut, forming a clamp which consists, on the one hand, of the head and, on the other hand, of a flange closing the rubber tube. This blind rivet nut can be detached from its workpiece again when released by turning back the fastening screw and can therefore be used several times. Owing to the use of the elastic rubber tube, it does not form a rigid connection to the workpiece. Owing to the need to use an elastic rubber tube, this known blind rivet nut is not comparable to the blind rivet nut with pulling mandrel according to the invention. Furthermore, the known blind rivet nut has to be set by the tightening of the fastening screw, and the blind rivet nut is immediately detached from the workpiece carrying it when the fastening screw is loosened. Owing to this feature of the setting of the known blind rivet nut, the art forming the basis thereof follows a path deviating from the blind rivet nut according to the invention since the setting of a blind rivet nut with a pulling mandrel which remains freely rotatable in the blind rivet nut after the setting operation is not possible therewith owing to the special design of the know blind rivet nut. In this respect, therefore, there is a further fundamental difference between this blind rivet nut and the blind rivet nut with pulling mandrel according to the invention.

A voluminous prior art exists relating to blind rivet nuts. The embodiment described hereinbefore is to the fore and the same setting process is employed (see European Patent Applications 305868, 264870, U.S. Pat. Nos. 2,409,352, 3,948,142, 2,565,019, 3,461,771, GB-PS 1205744, DE-OS 3240539).

The object of the invention is to design a blind rivet nut with pulling mandrel so as substantially to simplify the processing thereof.

BRIEF DESCRIPTION OF THE INVENTION

According to the present invention, a blind rivet nut with a pulling mandrel having a rivet tube with flange which is provided on its side remote from the flange with an internal thread extending from the end of the rivet tube via a portion of the rivet tube to a clinch zone of the rivet tube which is enlarged when the blind rivet nut is set by means of the pulling mandrel fitting into the internal thread such that a workpiece receiving the blind rivet nut is clamped by the flange and the enlargement is characterized in that the pulling mandrel is constructed as a self-tapping cap screw which is refitted in the blind rivet nut and of which the cap forms the abutment for a setting tool.

The use of the pre-fitted cap screw as a pulling mandrel initially affords the significant advantage that the blind rivet nut inserted into a corresponding hole in a workpiece is already provided with a pulling mandrel so that need to twist a special pulling mandrel into the blind rivet nut inserted into the hole is eliminated. The setting tool can therefore set immediately on the pre-fitted cap screw. This results in a combined effect whereby the cap of the cap screw can be utilized as an abutment for the setting tool. The need for firm clamping of the pulling mandrel in the setting tool, as normal with conventional blind rivets, is eliminated. The setting tool merely requires claws which grip behind the cap of the pre-fitted cap screw forming the abutment, without a special pressure having to be exerted on the shank of the cap screw. In addition, the cap screw utilized as a pulling mandrel can then remain for the subsequent fixing of a further workpiece as a fastening screw in the set blind rivet nut. The processing of the blind rivet nut with pulling mandrel is therefore very simple and is eminently suitable for the automatic setting of blind rivet nuts which is a condition for the use of blind rivet nuts, for example in the car industry, where automation of the individual production phases and therefore also the automatic supply are in the fore and are substantially simplified by the combination of blind rivet nut and pulling mandrel. Even if the set blind rivet nut is subsequently to be provided with a different screw and the pre-fitted cap screw is therefore to be screwed out some time after the setting operation, this does not affect the advantageous processing of the blind rivet nut, as the screwing-in and out of a special pulling mandrel pertaining to the setting tool, necessary when using the prior art, is eliminated in any case.

In accord with this invention, the screw is a thread-cutting screw which forms the thread in the rivet tube during the pre-fitting operation. With this design, therefore, the forming of the thread coincides with the turning-in of the pulling mandrel and this substantially simplifies the production of the unit consisting of "blind rivet nut with pulling mandrel".

Within the automotive industry especially, as well as in other production processes, fastener parts or assemblies are commonly manufactured in quantity by a supplier, transported to a manufacturing plant where they will be used, and then delivered to a point of use through production machinery which usually involves a vibrating mechanism for separating and properly orienting the fasteners. In the course of such handling, transporting and vibrating, conventional screws placed in pre-threaded bores are not under tension and therefore can rotate. As a consequence, the screws may become separated from the associated part or, in the particular case of a blind rivet, may move relative to the rivet flange. This can cause either failure of the pulling tool jaws to locate the screw cap or, if the screw has moved relative to the rivet flange, improper rivet set due to inadequate clinching. This is due to the fact that, if the screw has moved from its desired position, the full stroke of the setting mechanism may produce either excessive or insufficient deformation of the rivet tube.

A particular advantage of the assembly of this invention is that the self-tapping screw, when it is driven into the rivet, forms the internal thread by forcing metal to move out of the path of the cutting threads. Thus, the thread of the self-tapping screw fits exactly into the internal thread which it formed with no clearance or tolerance gap between the two. Due to the resultant tight fit of the screw into the rivet, it is very difficult to move the screw relative to the rivet. Therefore, when the assembly reaches the rivet-setting point after much random vibration, shaking and handling, the screw is still located at a pre-determined distance from the rivet flange. It can immediately be found by the automated pulling head and the rivet set will be good.

Of course, if the cap screw is repeatedly moved into and removed from the rivet tube, the formed threads in the tube will gradually be moved to open some clearance between the tube threads and the screw threads, thus reducing the degree of engagement. Therefore, the screw should be moved as little as possible after it is fully engaged with the rivet tube. In a preferred embodiment, the screw is driven once into the tube until the self-tapping thread is fully engaged with the new tube threads. Thereafter, the screw is not rotated again until after the rivet has been set.

To enable the cap screw to exert, over an adequate length, the pulling force which is to be transmitted by it onto the rivet tube during the setting operation without impairing the fastening of a component on the workpiece, which is necessary after the setting of the blind rivet nut, the blind rivet nut with pulling mandrel is preferably constructed such that the cap screw extends completely through the portion of the rivet tube containing the thread in the pre-fitted state while allowing a selected amount of clearance between the screw cap and the flange for gripping by the setting tool. With this design, therefore, there is adequate clearance between the screw cap and the flange after the setting of the blind rivet nut for a component gripped by the cap screw to be fastened on the workpiece by the cap screw being turned into the set blind rivet nut.

BRIEF DESCRIPTION OF THE DRAWINGS

In order that the invention be better understood, a preferred embodiment will not be described in greater detail by way of example with reference to the accompanying drawings in which.

DETAILED DESCRIPTION OF DRAWINGS AND PREFERRED EMBODIMENT

Figure 1:
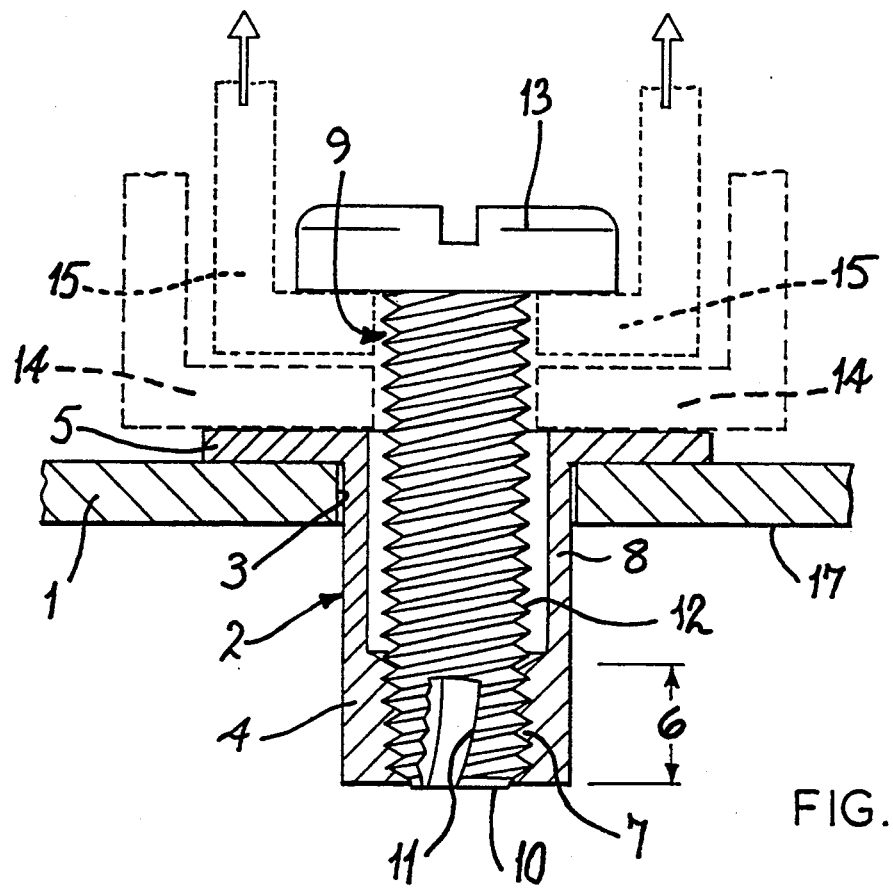
FIG. 1 shows in section the blind rivet nut inserted into a workpiece with pre-fitted pulling mandrel in the unset state.

FIG. 1 shows the workpiece 1 which consists of a sheet metal plate and into which the blind rivet nut 2 is inserted, more specifically in its original state prior to deformation by the setting process. The hole 3 is worked into the workpiece 1 to receive the blind rivet nut 2. The blind rivet nut 2 consists of the rivet tube 4 and the flange 5 resting on the workpiece 1. On the side of the rivet tube 4 remote from the flange 5, the rivet tube 4 has a portion 6 provided with the internal thread 7. Adjacent to the portion 6 the rivet tube 4 consists of the clinch zone 8 of which the internal diameter corresponds to the base of the internal thread 7. This internal diameter of the clinch zone 8 can also be enlarged relative to the base of the internal thread 7, producing a thinner wall of the rivet tube 4 for the clinch zone 8 than in its portion 6. The deformability of the material of the blind rivet nut 2 consisting of metal, in particularly of deformable steel or, for example, of aluminum, is decisive for this.

Into the blind rivet nut 2 there is turned the cap screw 9 which is to be used as a pulling mandrel. In accord with this invention, the screw 9 is a self-tapping screw and is provided on its end face 10 with the cutting edge 11 for this purpose. This is a known design of a self-tapping screw. During its first entry into the rivet body, the self-tapping thread 12 forces the matching thread 7 into the rivet tube. Only the minimum amount of material moves out of the way and thus the frictional engagement between threads 7 and 12 is very high. As a result, it is very unlikely that the screw 9 will be accidentally moved relative to the rivet. The thread 12 of the self-tapping screw consequently fits exactly into the internal thread 7 of the rivet tube 4 and is therefore secured thereby. The cap screw 9 is provided with the cap 13 serving as an abutment for a setting tool during the setting process described hereinbelow.

In automated production lines, it is critical that the rivet setting tool can quickly find and engage the cap of the screw and, by movement through a predetermined stroke, cause exactly the desired expansion of the rivet tube. The precise location of the cap screw 9 relative to the associated rivet flange, as enabled by this invention, significantly reduces the risk of missing screws and failure of tool-screw engagement as well as the number of improperly set rivets.

For setting the blind rivet nut 2 shown in FIG. 1 with cap screw 9, a known setting tool, which is not of interest as such in this connection, with the pressure pieces 14 press against the flange 5 while the claws 15 gripping behind the cap 13 exert a pulling force thereon in the direction of the arrow indicated. The pressure pieces 14 and the claws 15 each surround the shank of the cap screw 9 but it is not necessary to clamp the shank of the cap screw 9. It is merely necessary for the two claws 15 to grip sufficiently far behind the cap 13 so as not to slide off it when the pulling force is exerted.

Figure 2:
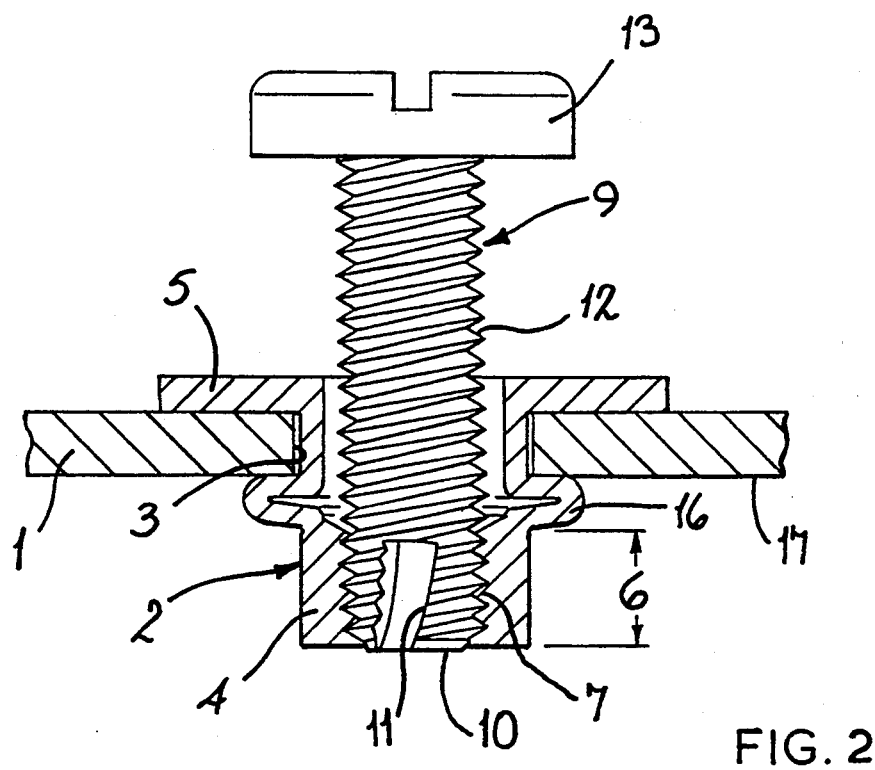
FIG. 2 shows in section the blind rivet nut of FIG. 1 after setting operation.

Owing to the pulling force exerted on the claws 15, the clinch zone 8 is clinched on the side of the workpiece 1 remote from the flange 5, forming the enlargement 16 which is shown in FIG. 2, rests firmly against the underside 17 of the workpiece 1 owing to the pulling force acting on the portion 6 and therefore clamps the workpiece 1, together with the flange 5. The blind rivet nut 2 is therefore set and riveted to the workpiece 1, the internal thread 7 of the tube 4 remaining undeformed as it is held adequately by the respective turns of the thread 12 of the cap screw 9.

Owing to this setting process there exists on the workpiece 1 a fastening means which consists of set rivet tube 2 and cap screw 9 and with which any part fitting beneath the cap 13 can be screwed on the workpiece 1 by turning in the cap screw 9, which part may previously have been attached on the cap screw 9 at this point in the sense of a pre-fitting process. However, it is also possible to screw out the cap screw 9 after the setting of the blind rivet nut 2 and to turn another suitable screw in to the blind rivet nut 2, for example a substantially longer or shorter screw.

The cap screw 9 shown in FIG. 1 can also project with its end face 10 from the lower end of the rivet tube 4. When the cap screw 9 is turned further into the set blind rivet nut 2 according to FIG. 2 to screw a further part onto the workpiece 1, this is clearly so.

We claim:

1. A blind rivet nut assembly adapted to be inserted into a workpiece and pulled from one side to set the rivet nut comprising:
   a rivet nut comprising a flange at one end and a tube with an internal bore extending from said flange, said tube comprising a first clinching portion and a second portion;
   a pulling mandrel for said rivet nut, said mandrel comprising a head adapted to be engaged by a pulling tool, a screw portion extending through said clinching portion of said rivet nut and a self-tapping tip, said tip being in tight frictional engagement with the surface of threads formed within said second portion during the entry of said tip into said second portion so as to resist movement of said pulling mandrel during handling and transporting of said assembly prior to installation thereof;
   said pulling mandrel head and said screw portion being adapted to attach at least one additional component to said workpiece after setting of said rivet nut.

2. A blind rivet nut assembly as claimed in claim 1 wherein said head of said pulling mandrel is spaced from said flange of said rivet nut and wherein said pulling mandrel extends sufficiently within said internal bore in said second portion of said rivet nut to enable a pulling force on said mandrel to collapse said clinching portion.

3. A stable blind rivet nut assembly adapted to be inserted into a workpiece and pulled from one side to set the rivet nut comprising:
   a rivet nut comprising a flange at one end and a tube with an internal bore extending from said flange, said tube comprising a first clinching portion and a second portion;
   a pulling mandrel for said rivet nut, said mandrel comprising a head adapted to be engaged by a pulling tool and a portion having screw threads thereon extending into said second portion of said rivet nut, a portion of said threads being in tight frictional engagement with the surface of threads created within said second portion of said rivet nut during the entry of said mandrel into said second portion so as to resist movement of said pulling mandrel during handling and movement of said assembly prior to installation thereof in a workpiece;
   said pulling mandrel head and said threaded portion being adapted to attach at least one additional component to said workpiece after setting of said rivet.

4. A blind rivet nut assembly as claimed in claim 3 wherein said pulling mandrel extends sufficiently into said second portion of said rivet nut to enable a pulling force on said mandrel head to collapse said clinching portion.

5. A method of making a stable blind rivet nut assembly comprising the steps of:
   providing a blind rivet nut having a flange at one end, a tube with an internal smooth bore at the other end and a thin walled clinching portion extending therebetween;
   providing a pulling mandrel comprising a head portion with an engagable surface facing said rivet nut flange, a threaded stud portion extending from said engagable surface and a self-tapping tip having a cutting edge at the end of said stud portion, the length of said pulling mandrel exceeding the length of said rivet nut by an amount at least equal to the depth of a rivet-setting pulling jaw; and
   inserting said pulling mandrel into said rivet nut so that said self-tapping tip cuts internal threads in said tube, said pulling mandrel being rotated into said tube until said self-tapping tip is completely within said tube.

6. A method of providing a set blind rivet nut assembly in a workpiece wherein the pulling mandrel for said blind rivet nut serves as a screw-threaded removable and replaceable fastener in said blind rivet nut comprising:
   performing the steps of providing a blind rivet nut assembly as claimed in claim 4;
   pulling said mandrel to set said rivet nut; and
   utilizing said pulling mandrel in said blind rivet nut to attach at least one additional component to said workpiece.

7. A method of making a stable blind rivet nut assembly comprising the steps of:
   providing a blind rivet nut having a flange at one end, a tube with an internal smooth bore at the other end and a thin walled clinching portion therebetween;
   providing a pulling mandrel comprising a head portion with an engagable surface facing said flange, and a threaded stud portion extending from said engagable surface;
   rotating said pulling mandrel into said rivet nut so that said threaded stud portion forms internal threads in said tube, said pulling mandrel being rotated into said tube sufficiently to enable a pulling force on said mandrel to collapse said clinching portion; and
   stopping said rotation while said pulling mandrel head portion is spaced from said flange by an amount at least equal to the depth of a rivet-setting pulling jaw.

8. A method of providing a set blind rivet nut assembly in a workpiece wherein the pulling mandrel for said blind rivet nut serves as a screw-threaded removable and replaceable fastener in said blind rivet nut comprising:

performing the steps of providing a blind rivet nut assembly as claimed in claim 6;
pulling said mandrel to set said rivet nut; and
utilizing said pulling mandrel in said blind rivet nut to attach at least one additional component to said workpiece.

* * * * *